United States Patent
Ekambaram et al.

(10) Patent No.: US 9,848,380 B1
(45) Date of Patent: Dec. 19, 2017

(54) CONTEXT-BASED COORDINATED DATA RETRIEVAL FOR MOBILE DEVICES

(71) Applicant: INTERNATIONAL BUSINESS MACHINES CORPORATION, Armonk, NY (US)

(72) Inventors: Vijay Ekambaram, Tamilnadu (IN); Roger C. Snook, Charles Town, WV (US); Leigh A. Williamson, Austin, TX (US); Shinoj Zacharias, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/188,457

(22) Filed: Jun. 21, 2016

(51) Int. Cl.
*H04W 52/02* (2009.01)
*H04W 40/00* (2009.01)
*H04W 56/00* (2009.01)
*H04W 4/02* (2009.01)
*H04W 72/10* (2009.01)
*H04W 88/02* (2009.01)

(52) U.S. Cl.
CPC ....... *H04W 52/0209* (2013.01); *H04W 4/023* (2013.01); *H04W 40/005* (2013.01); *H04W 56/0015* (2013.01); *H04W 72/10* (2013.01); *H04W 88/02* (2013.01)

(58) Field of Classification Search
CPC .................................................. H04L 43/0811
See application file for complete search history.

(56) References Cited

U.S. PATENT DOCUMENTS

| 8,761,064 B2 | 6/2014 | Soliman et al. |
| 9,282,516 B2 | 3/2016 | Sen et al. |
| 2002/0107807 A1* | 8/2002 | Ketonen ................ G06Q 10/10 705/51 |
| 2008/0098093 A1 | 4/2008 | Simon et al. |

(Continued)

FOREIGN PATENT DOCUMENTS

CN 103369562 10/2013

OTHER PUBLICATIONS

Li Zhigang et al., "Energy-Efficient Task Allocation for Data Fusion in Wireless Sensor Networks", http://dx.doi.org/10.4108/ICST.MOBIQUITOUS2009.6877, 6 pages.

(Continued)

*Primary Examiner* — Hsin-Chun Liao
(74) *Attorney, Agent, or Firm* — Michael A. Petrocelli; Matthew M. Hulihan; Heslin Rothenberg Farley & Mesiti PC

(57) ABSTRACT

Context-based coordinated data retrieval for mobile devices is provided. An interface between application code of a mobile device and an operating system of the mobile device receives a declarative language based data-retrieval request made by the application code for data from an I/O device of the mobile device. Based on operating context of the mobile device, opportunistic coordination rule(s) are selected from a local rules cache, the rule(s) representative of at least one power-saving option for retrieving data for responding to the request. The rule(s) are evaluated to determine how to retrieve data for responding to the request, and action(s) are performed based on the evaluating, the action(s) including responding to the request.

25 Claims, 5 Drawing Sheets

(56) References Cited

U.S. PATENT DOCUMENTS

| | | | |
|---|---|---|---|
| 2009/0034443 A1 | 2/2009 | Walker et al. | |
| 2012/0158681 A1* | 6/2012 | Petter | G06F 17/30115 707/704 |
| 2013/0290755 A1* | 10/2013 | Wolman | G06F 9/5094 713/320 |
| 2014/0126488 A1 | 5/2014 | Punz et al. | |
| 2014/0274009 A1 | 9/2014 | Do et al. | |
| 2014/0274031 A1 | 9/2014 | Menendez | |
| 2016/0026718 A1* | 1/2016 | Hopkins | G06F 17/30867 707/715 |

OTHER PUBLICATIONS

Luka Malisa et al., "Detecting Mobile Application Spoofing Attacks by Leveraging User Visual Similarity Perception", https://eprint.iacr.org/20151709.pdf, 17 pages.

Beth Schultz, "Context-Aware Mobility: What is it and How Will it Change the Business World?", Computerworld, Jul. 2, 2009, http://www.computerworld.com/article/2525703/mobile-wireless/context-aware-mobility-what-is-it-and-how-will-it-change-the-business-world-.html.

H. S. Ashwini et al., "Middleware for efficient power management in mobile devices", http://dl.acm.org/citation.cfm?id=1292387, 2006.

"A Policy-Controlled Adaptive Platform for Querying Realtime SmartPhone Data", IPCOM000228639D, Jun. 26, 2013, ip.com.

Joseph Kreidler, "Network Access Point Presence Application Proxy", IPCOM000176238D, Nov. 10, 2008, ip.com.

Li Zhigang et al., "Energy-Efficient Task Allocation for Data Fusion in Wireless Sensor Networks", http://dx.doi. org/10.4108/ICST.MOBIQUITOUS2009.6877, 6 pages.

Luka Malisa et al., "Detecting Mobile Application Spoofing Attacks by Leveraging User Visual Similarity Perception", https://eprint.iacr.org/2015/709.pdf, 17 pages.

"Context Awareness", Wikipedia, Mar. 21, 2016, https://en.wikipedia.org/wiki/Context_awareness.

Beth Schultz, "Context-Aware Mobility: What is it and How Will it Change the Business World?", Computerworld, Jul. 2, 2009, http://www.computerworld.com/article/2525703/mobile-wireless/context-aware-mobility—what-is-it-and-now-will-it-change-the-business-world-.html.

Matthias Bohmer et al., "Contextualizing Mobile Application for Context-Aware Recommendation", http://www.dfki.de/~mabo04/publications/Boehmer-PERVASIVE10-ContextualizingMobileApps.pdf, 4 pages.

H. S. Ashwini et al., "Middleware for efficient power management in mobile devices", http://dl.acm.org/citation.cfm?d=1292387, 2006.

Shivajit Mohapatra et al., "Power-Aware Middleware for Mobile Applications", http://www.ics.uci.edu/~dsm/papers/2011/moh11book.pdf, 25 pages.

* cited by examiner

| MOBILE CONTEXT | RULES |
|---|---|
| 302a — CONTEXT 1 (USER HAS ONLY WATCH) | RULE 1, RULE 2... — 304a |
| 302b — CONTEXT 2 (USER HAS WATCH AND MOBILE) | RULE 4, RULE 5.... — 304b |
| 302c — CONTEXT 3 (USER HAS WATCH AND MOBILE; NEAR USER 2 WHO HAS MOBILE | RULE 1, RULE 7..... — 304c |

CONTEXT-BASED COORDINATED DATA RETRIEVAL FOR MOBILE DEVICES

BACKGROUND

In modern times with the proliferation of mobile devices, users are often in situations with accessibility to multiple mobile devices and capabilities thereof. Common capabilities of many types of mobile devices include the ability to obtain measurements of the surrounding environment or user, detect location, detect and provide network connectivity, and/or detect motion. However, when mobile devices in proximity of each other obtain and record similar measurements, this results in duplication of work and power wasting redundancy.

Meanwhile, battery life of these devices is of particular concern because mobile devices by their nature depend on a battery with limited capacity as a power source between charging sessions. Research has shown that power consumed by sensors or other input/output (I/O) mobile device components used for gaming, Global Positioning System (GPS), cellular, and other network connectivity contribute a significant amount to overall power consumption of the mobile device. In many instances, sensors, connectivity, and other I/O devices are the primary sources of battery drain. This problem will only become more acute in the future as additional types of smart sensors enter the marketplace and everyday use. The duplication of work noted above for multiple devices operating in a common environment or context to obtain substantially the same measurement is a waste of power.

Context-aware mobile applications are typically limited to "apps" that run on smartphones and do not address a range of smart-sensor devices, such as wearable mobile devices and 'internet of things' (IoT) sensing devices. In addition, other types of power saving schemes are applicable to large server-based software systems and fail to address widely-distributed, smart device, sensor-based systems that include multiple available mobile devices.

SUMMARY

Described herein are aspects that facilitate efficient cooperative coordination among mobile devices, for instance to share measurements across a set of participating devices. Methods, systems, and computer program products that support opportunistic collaboration and cooperation between smart sensing and other mobile devices are provided.

Shortcomings of the prior art are overcome and additional advantages are provided through the provision of a computer-implemented method. The method includes receiving, by an interface between application code of a mobile device and an operating system of the mobile device, a declarative language based data-retrieval request made by the application code for data from an input-output (I/O) device of the mobile device. Based on operating context of the mobile device, the method further includes selecting one or more opportunistic coordination rules from a local rules cache, the one or more opportunistic coordination rules being representative of at least one power-saving option for retrieving data for responding to the request for data from the I/O device. The method further includes evaluating the one or more opportunistic coordination rules to determine how to retrieve data for responding to the request. In addition, the method includes performing one or more actions based on the evaluating, the one or more actions including responding to the request.

Further, a computer program product including a computer readable storage medium readable by a processor and storing instructions for execution by the processor is provided for performing a method. The method includes receiving, by an interface between application code of a mobile device and an operating system of the mobile device, a declarative language based data-retrieval request made by the application code for data from an input-output (I/O) device of the mobile device. Based on operating context of the mobile device, the method further includes selecting one or more opportunistic coordination rules from a local rules cache, the one or more opportunistic coordination rules being representative of at least one power-saving option for retrieving data for responding to the request for data from the I/O device. The method further includes evaluating the one or more opportunistic coordination rules to determine how to retrieve data for responding to the request. In addition, the method includes performing one or more actions based on the evaluating, the one or more actions including responding to the request.

Yet further, a computer system is provided that includes a memory and a processor in communications with the memory, wherein the computer system is configured to perform a method. The method includes receiving, by an interface between application code of a mobile device and an operating system of the mobile device, a declarative language based data-retrieval request made by the application code for data from an input-output (I/O) device of the mobile device. Based on operating context of the mobile device, the method further includes selecting one or more opportunistic coordination rules from a local rules cache, the one or more opportunistic coordination rules being representative of at least one power-saving option for retrieving data for responding to the request for data from the I/O device. The method further includes evaluating the one or more opportunistic coordination rules to determine how to retrieve data for responding to the request. In addition, the method includes performing one or more actions based on the evaluating, the one or more actions including responding to the request.

Aspects of the above have advantages that include effectuating power savings, increased battery life, and more consistent and coordinated user experiences with the participating mobile devices.

The I/O device may be in a dormant state and the operating context may indicate proximity to another mobile device. The one or more opportunistic coordination rules may indicate that the data for responding to the request is to be obtained from the another mobile device, and the one or more actions can include retrieving from the another mobile device the data for responding to the request and providing the data in responding to the request. This has an advantage of leveraging capabilities of nearby devices, which may already have access to the data or already plan to obtain the data from one of its I/O devices. This can advantageously save power of the requesting device. Additionally, it provides coordinated data retrieval to eliminate redundant data gathering.

The one or more actions performed can further include initiating a power-saving action to adjust a state of another I/O device other than the I/O device of the mobile device. In other words, the action(s) can include adjusting the state of the another I/O device to consume less power, which has an advantage of power savings and reducing demand on hardware. The another I/O device may be another I/O device of the mobile device, and the power saving action can include adjusting the state of the another I/O device to decrease its power consumption or avoid additional power consumption. This has an advantage of saving power in the mobile device on which the initial declarative language based data-retrieval request is initiated. Additionally or alternatively, the mobile device may be a first mobile device, and the another I/O device may be of a second mobile device different than the first mobile device. The initiating the power-saving action can include providing a communication to the second mobile device indicating that the state of the another I/O device can be adjusted to facilitate a decrease in power consumption or avoid additional power consumption. This has an advantage of saving power of other participating mobile devices.

The evaluating the one or more opportunistic coordination rules can select, based on requests made to one or more other I/O devices, an I/O device to be used to obtain the data for responding to the request, and the one or more actions can include using the selected I/O device to obtain the data for responding and providing the data in responding to the request. This has an advantage of selecting a most optimal (less power-intensive) option in terms of the particular I/O device to use for obtaining the data.

At least one opportunistic coordination rule of the one or more opportunistic coordination rules may be obtained from a plurality of opportunistic coordination rules available from a cloud-based rules engine and identified and validated based on crowd-sourced data. This has an advantage that at least some rules can be maintained, updated, coordinated, defined, etc. in a central repository, leading to ease of management and coordination. A collection of initial opportunistic coordination rules may be statically loaded into the cloud-based rules engine and dynamically updated based on the crowd-sourced data to produce at least some of the plurality of opportunistic coordination rules available from the cloud-based rules engine. This has an advantage that initial rules can seed the cloud-based rules engine and be updated for flexibility, to account for new capabilities, devices, information about power consumption, and so on. The crowd-sourced data can include online resources and operating system guidelines, where the at least one opportunistic coordination rule of the one or more opportunistic coordination rules may be configured and initialized based on the online resources and operating system guidelines. This has an advantage of enabling accounting for up-to-date and accurate information in the rules building and updating processes.

At least one opportunistic coordination rule of the one or more opportunistic coordination rules may be added to the plurality of opportunistic coordination rules available from the cloud-based rules engine based on analyzing the crowd-sourced data for one or more patterns and automatically learning from the crowd-sourced data. This has an advantage of providing flexibility and adaptability in rule creation and updating, and enabling machine learning to automatically identify rules that lead to power savings.

The local rules cache may be updated periodically or aperiodically, for instance based on a change in context under which the mobile device currently operates. The updating can include recognizing the change in context under which the mobile device currently operates, querying the cloud-based rules engine for opportunistic coordination rules applicable to the changed context, the plurality of opportunistic coordination rules being representative of power-saving options for retrieving data for responding to requests for data from I/O devices under different operating contexts, receiving, at runtime and with the mobile device operating under the changed context, a set of opportunistic coordination rules in response to the querying, and storing the set of opportunistic coordination rules to the local rules cache, the set of opportunistic coordination rules being at least one opportunistic coordination rule of the one or more opportunistic coordination rules. This enables the mobile device to reach out to the cloud facility to retrieve the rules that are applicable to the current context. This has an advantage of enabling the mobile device to selectably retrieve the rules that are applicable to the mobile device given the current operating context, while reducing the amount of data (in the form of rules) that is cached on the mobile device.

The local rules cache can include at least one user-defined opportunistic coordination rule and at least one cloud-based rules engine-obtained opportunistic coordination rule. The selecting of the one or more opportunistic rules from the rules cache for evaluation can give priority to the at least one user-defined opportunistic coordination rule over the at least one cloud-based rules engine-obtained opportunistic coordination rule. This has an advantage of enabling users to override actions that the cloud-based rules would otherwise have dictated, providing management and control to the user to tailor or tweak mobile device behavior in desired situations. For instance, the evaluating the one or more opportunistic coordination rules can include recognizing that a power sensitivity mode under which the mobile device is currently operating indicates that a power-saving option for retrieving data for responding to the request is to be overridden and instead the I/O device of the mobile device is to be used to obtain the data for responding to the request. In this situation, the one or more actions can include using the I/O device to obtain the data for responding and providing the data in responding to the request.

The plurality of opportunistic coordination rules available from the cloud-based rules engine can dictate coordination among a collection of mobile device I/O devices, the mobile device I/O devices being (i) components of the mobile device, (ii) components of multiple mobile devices of a common user, or (iii) components of multiple mobile devices of multiple different users. This has an advantage of providing coordinated power savings among the participating devices.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
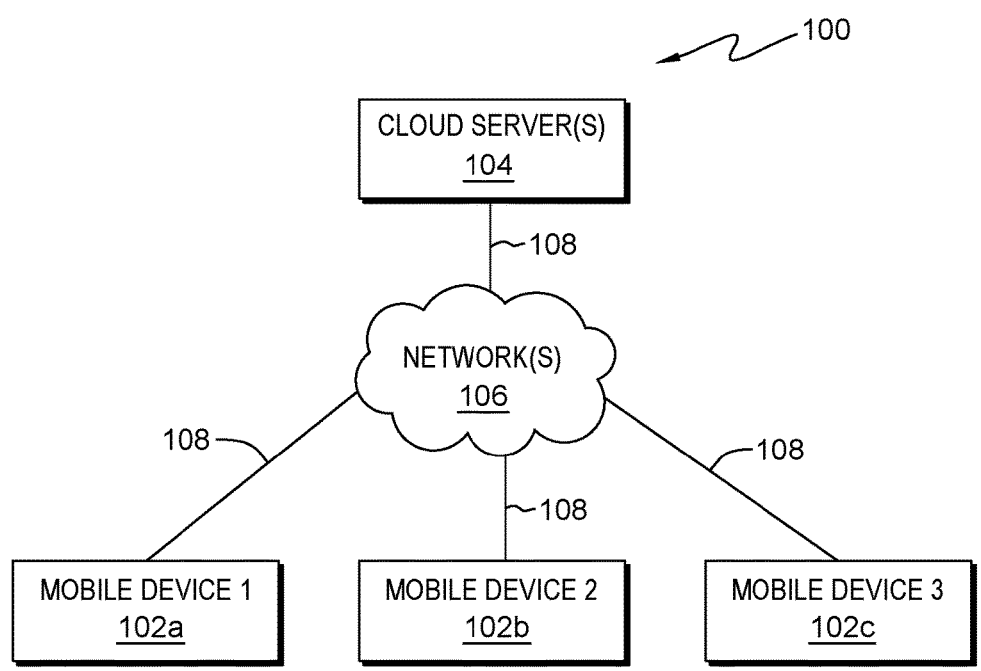
FIG. 1 depicts an example environment to incorporate and use aspects described herein.

Mobile devices include smartphones, tablets, and other portable handheld communication devices. Mobile devices also include wearable mobile devices, some of which are provided as wearable eyewear, wrist watches, or wristbands. Example commercially available wearable mobile devices include the Apple Watch® offered by Apple Inc., Cupertino Calif., U.S.A. (of which APPLE WATCH is a trademark), and the Google Glass™ wearable computing device offered by Google, Inc., Mountain View, Calif. (of which GLASS is a trademark). Sensing devices, such as 'internet of things' (IoT) sensors and smart home equipment, smart cars, personal data assistants (PDAs), handheld game consoles, and personal navigation devices are additional examples of mobile devices, and other examples exist.

Aspects described herein provide cooperative coordination among mobile devices, and specifically opportunities for power-saving options and actions by leveraging information from, e.g., other mobile devices. In some aspects, a software layer is identified and provided that resides installed on the cooperating mobile devices and exposes an application programming interface (API) for application-level code within these devices to use via declarative language requests when requesting data from a local input/output (I/O) device. Example of data from I/O devices include environmental data such as location from a GPS device, temperature from a thermometer, motion from an accelerometer, angle from a gyroscope, nearby wireless networks from a Wi-Fi network adapter, and nearby devices from a Bluetooth adapter (BLUETOOTH is a registered trademark of Bluetooth SIG, Inc., Kirkland, Wash., U.S.A.). Other types of I/O devices and data requested therefrom exist.

A programmatic interface referred to herein as an Opportunistic Coordination Declarative Interface (OCDI) sits between application code of a mobile device and the mobile device's operating system (OS). The OCDI receives/intercepts calls made by the application code to obtain data, such as environmental measurements, from I/O device(s) of the mobile device. In some embodiments, the application code performing the calls will be coded to utilize and leverage the provided OCDI. Connectivity between mobile devices and other remote devices, such as cloud servers, may be provided by existing networking and other communications technology. Opportunistic coordination described herein can leverage such communication channels between devices and, as an example, save power by reducing the redundancy of hardware functionality across mobile devices when requesting the same or similar data. The opportunity to coordinate arises in some examples when there is a connection, direct or indirect, between the mobile devices, such as if the devices are paired to communicate or if they are connected to a common network, as examples.

Conventionally, a mobile device application seeking data from a local I/O device, such as a hardware sensor, would make an OS API call to query the local I/O device. According to aspects described herein, instead of using the local device hardware sensor to respond to the application code request, a software layer interface (OCDI) described herein consults a context-based opportunistic rule look-up facility, such as a table or other data structure. The facility may have been previously downloaded and stored locally from a cloud-hosted, crowd-sourced intelligent rules engine, for instance. OCDI can receive the application request for the environmental measurement or other I/O and can then consult the local context-aware rules cache in order to determine how best to retrieve the requested data and respond to the application's request. How to respond may be dependent on the available surrounding smart sensor devices and/or other mobile devices and their capabilities. An algorithm performed by the OCDI can obtain the proper data (e.g. a measurement value) from a cooperating device, or possibly revert to the local sensor if no cooperating device is available, and return this value to the application in response to its request.

A management layer may also be provided that allows for further tuning of a the OCDI behavior, for instance within any particular cooperating mobile device. This allows management of tradeoffs between power savings (via the OCDI opportunistic coordination) and other functional characteristics depending on the preference level of the user of the mobile device.

Problems associated with several approaches are addressed by aspects described herein. One approach responds to developer requirements by specifically coding the individual applications in ways that save power through use of data sharing within the device, across devices and across users. In such an approach, the applications communicate with each other directly and manage their exchanges. However, hard coding the applications themselves to coordinate theses exchanges leads to static behavior that is difficult to fix or update for performance improvement. These and other drawbacks are addressed by aspects described herein, for instance, coordination over which device to use in providing the requested data, when to obtain the data, how to obtain the data, and identifying other opportunities for power savings. According to aspects described herein, these cognitive aspects of OCDI can be dynamically returned to a cloud source for guiding these and other decisions, enabling dynamic changes in the coordinated behavior. Aspects described herein can learn about the dynamic environment in which the device operates and adjust accordingly.

The OCDI also provides a generic framework to interface user applications and the mobile device operating system such that the user applications can issue a declarative language based data-retrieval request to the interface instead of calling the mobile device operating system API directly to fetch data from an I/O device. The interface can apply the right coordination rule(s) within the mobile device, across device(s) of the user, and across device(s) of other user(s) to fetch the user requested data while minimizing overall power consumption. Rules can also inform of other power saving options, such as turning off a particular I/O device when appropriate.

FIG. 1 depicts an example environment 100 to incorporate and use aspects described herein. Environment 100 includes mobile device 1 (102a), mobile device 2 (102b), and mobile device 3 (102c) that each communicate with network(s) 106. Network(s) 106 include one or more wired and/or wireless networks, including one or more local area networks, one or more wide area networks such as the internet, and/or one or more wireless networks. Also connected to network(s) 106 are cloud server(s) 104, such as one or more remote, cloud-hosted facilities, such as at least one server hosting a cloud-based rules engine described herein. Mobile devices 102a, 102b and 102c communicate with remote devices, such as each other and/or cloud server(s) 104, across wired and/or wireless communication paths 108. In some examples, a mobile device communicates with another device, such as another mobile device, through a direct communication path by pairing with the another device. An example direct communication path is a Bluetooth® or Wi-Fi Direct connection between the two devices. In FIG. 1, though not shown, two or more mobile devices may be networked/connected by a direct communication path.

Under a conventional approach, when a mobile device application ("app") needs GPS data, it calls GPS-related API(s) provided by the mobile device OS to fetch the requested data. The mobile device OS uses hardware of the mobile device to fetch the data.

In contrast, aspects described herein enable the app to construct and provide a declarative language based data-retrieval request (ex. "Fetch current GPS location") rather than directly calling the OS's GPS API(s). Declarative language describes a requested action or indicates what is being requested without dictating how to accomplish the action, i.e. the process to use to address the request and respond. Colloquially, it describes the 'what' but not the 'how'. The application provides the request to the OCDI described herein, which may be incorporated into/with the installed mobile OS and/or as a middleware component interfacing the app to the mobile OS. The interface can determine a best (e.g. most power efficient) manner to obtain the requested data based on available opportunistic coordination rules. By way of specific example referring to FIG. 1, assume that mobile device 1 (102a) of FIG. 1 is a user's personal navigation device operating in a navigation mode and mobile device 2 (102b) is the user's smartphone, and that the user is traveling with both devices in a vehicle. Assume further that the user visits a website that requests the user's current GPS location and that the GPS hardware of the smartphone is disabled to save power. Aspects described herein might evaluate an opportunistic coordination rule and determine that there is a nearby mobile device (the user's personal navigation device) that can provide an appropriate GPS location. The current GPS location can be obtained from the personal navigation device, which likely already has an updated GPS location for the vehicle because it is in the navigation mode. The data retrieval may be done via a direct connection between the two devices, via a network provided within the vehicle, or via a wider network, such as the internet (i.e. via cellular networks), as examples.

As an alternative example, assume that it is determined that a device having an application requesting GPS location has remained stationary since a most recent GPS location retrieval. This might be determined based on, as examples, accelerometer readings that were being maintained by the device or based on persistent connection to a known statically-located wireless network (such as a home network). Aspects described herein may determine to respond with the prior-obtained most recent GPS location, on the basis that the device has not moved to an updated location. In this case, the GPS device may remain off but the application is provided with accurate data.

The framework provided herein is not specific to any particular type of sensor or other I/O device or hardware features. The declarative requests and handling thereof generically applies to any I/O data-retrieval capabilities of the mobile device or those provided by other mobile devices. Based on an identified operating context and scenario, mobile devices can identify, discover and/or obtain, on-the-fly, opportunistic rules for I/O data retrieval and leverage them to save power. This is a non-trivial challenge addressed by aspects described herein.

Advantageously, aspects described herein provide, in some embodiments, a dynamic, cloud-hosted system of power saving rule delivery. As new types of mobile devices and I/O devices thereof emerge, or new capabilities are added to existing devices, the system can learn and adapt to new coordination opportunities. There are various techniques that enable a system to learn based on feedback regarding changes to devices, features of new devices, updated capabilities, access to resources, and so on. Logic provided by a cloud-based rule engine gets invoked as a result of declarative requests and learns, for example, by pulling information from participating mobile devices. The rules can adapt dynamically based on, for example, monitoring power consumption associated with different alternatives and identifying the best, most efficient ways to respond to requests for different data given the different currently-available options for responding. Meanwhile, reprogramming of the applications to leverage the functionality is avoided because of the declarative nature of the requests, and changes to the mobile device (other than updating the rules that the OCDI uses to determine ways to respond) are avoided.

Accordingly, opportunistic cooperation rules can be discovered and validated through crowd-sourced style data gathering of measurement data across a large collection of devices, device types, user preferences, and other factors that go into determining optimum ways to respond to I/O data-retrieval requests. In some examples, these are synthesized into a relatively large collection of rules that may be of varying granularity, in terms of the applicable device types, device models, hardware parameters, user preferences, etc. Subsets of these rules can be loaded onto participating devices. The full set of rules for opportunistic cooperation may be reduced to a small set of context-aware (i.e. specific to the context in which a particular device operates) rules that may be cached on individual devices operating under that content. Providing each device with only the rules that are relevant to that device saves storage space and bandwidth.

Opportunistic coordination to provide power saving device coordination is achieved as between components of a single mobile device, components across multiple devices of a common user, and components across mobile devices of multiple different users.

In one embodiment, cooperation is provided between components residing in a common mobile device, referred to as intra-device opportunistic coordination. In this embodiment, the OCDI provides coordination and cooperation between sensors or other I/O devices within the common device and based on context in order to save power (decrease power consumption and/or avoid additional power consumption).

By way of specific example, assume that a mobile device includes, among other I/O devices, an accelerometer, a wireless network adapter (Wi-Fi) for network connectivity, and a cellular network adapter for cellular network connectivity. In general, Wi-Fi may be a preferred connectivity channel as compared to the cellular connection because of Wi-Fi's high bandwidth and lower cost. When readings from the accelerometer indicates that the mobile device is moving above a threshold speed (e.g. at driving speed, such as above 20 miles per hour), OCDI may recognize based on the continual accelerometer calls and responses that the Wi-Fi adapter should be turned off at least until the mobile device is detected to have slowed or stopped. This is because at high speed, Wi-Fi activity may result in hand-offs, active access point scanning, packet loss, and/or heavy retransmissions, leading to heavy power drain. Turning off the Wi-Fi adapter will avoid these power sinks. Under this example, an application calls to the interface to request data from the accelerometer in order to poll for information about the movement of the device. The application, to make use of the opportunistic coordination, issues the OS accelerometer calls as declarative language based data-retrieval requests to the OCDI. While the responses to these requests may utilize the local device's accelerometer, a library of rules that is linked into the application and/or the OCDI could make the determination that since this app is constantly calling the accelerometer and significant enough movement is detected, the Wi-Fi adapter may be disabled at least temporarily until the device is detected to have slowed or stopped, in which case a Wi-Fi connection may then be useful. Extending this example, if a request is sent by an application to connect to internet, OCDI might recognize (based on the accelerometer readings) that the device is moving and a Wi-Fi connection is not practical, and therefore may connect directly to the cellular connection to handle the internet connection request.

In another example, assume the mobile device also includes a GPS device for GPS location. As noted above, activated Wi-Fi drains battery power even when there is no data transfer. Wi-Fi's active or passive scanning periodically scans (e.g. every 2 to 10 seconds based on status) to update its scan list. Scanning continuously for a long time can lead to heavy battery power drain. As in the example above, information about mobile device location can be leveraged for power savings. In this example, OCDI could dictate a stop in Wi-Fi scanning when it identifies based on GPS calls and responses that the user (and by proxy, the mobile device) is not moving a significant distance. This is done on the premise that if the device has not changed location, the list of available wireless networks has likely not changed. Accelerometer readings can also factor in as above.

The above are just examples of where coordination among sensor and other I/O device activity can lead to better power savings in mobile devices; there are many other combinations of devices and applicable situations that may be involved.

In another embodiment, OCDI provides cooperation between components residing in different mobile devices owned and related by a same user, referred to as intra-user opportunistic coordination. In this embodiment, the OCDI provides coordination and cooperation between sensors or other I/O devices across multiple devices of a same user and based on context in order to save power (decrease power consumption and/or avoid additional power consumption). It is common for users to have multiple mobile devices with them (e.g. one or more smartphones, and one or more wearables, such as a smartwatch or wearable eyewear mobile device). These devices may include common types of I/O devices, such as sensors, like GPS devices or environmental sensors for temperature, humidity, acceleration, etc.

Examples are described above in which data is shared from one device to another in response to a request for data. For instance, GPS data from one mobile device that is actively using its GPS is provided in response to another device's request for a current location.

In addition to sharing data obtained from one sensor of one device when responding to a request for data from another sensor of another device, aspects discussed in the above in which activity of one device (e.g. GPS or accelerometer readings) inform power-saving actions applicable to other devices can be applied to the multi-device scenario of intra-user opportunistic coordination. For example, if a user's smartphone detects based on consecutive GPS readings that the smartphone is in motion, then not only can Wi-Fi of the smartphone be disabled to save power, but an indication of this power saving action (disabling Wi-Fi) can be provided to the user's smartwatch and any other Wi-Fi-capable device that is traveling with the user. More generally, whenever data obtained on one mobile device suggests that it is disadvantageous to keep-activated an I/O device of a nearby mobile device, an indication can be provided to the nearby mobile device to disable the I/O device of the nearby mobile device.

In yet another embodiment, OCDI provides cooperation between components residing in different mobile devices owned/operated by different users, referred to as inter-user opportunistic coordination. In this embodiment, the OCDI provides coordination and cooperation between sensors or other I/O devices across multiple devices of multiple different users and based on context in order to save power (decrease power consumption and/or avoid additional power consumption). In some examples, the mobile device may have no other relationship as between them other than that they are OCDI-participants. In the intra-user example above, the user's smartphone and wearable device(s) may be paired for data exchange (e.g. a fitness tracker synching with a smartphone). In inter-user coordination, the mobile devices may communicate and be coordinated through a remote server, rather than via a direct communication or relationship. Additionally or alternatively, the OCDI-participation may cause the devices of the different users to become paired or networked as part of a mesh or other multi-device configuration for the exchange of data and/or indications of power-saving actions.

It is common for different users to travel together, assemble, or meet in groups. In these contexts, there are scenarios where devices of different users may share their sensor or other I/O device data for better overall power management. As an example, several users who may or may not be acquainted may be traveling in the same car or other mode of transportation. Therefore, they may have a same speed, temperature, ambient noise level, changing location, and so on. This information can be leveraged in manners similar to those described above, in which other connected devices could provide I/O data values without the need for a requesting mobile device to query its own hardware. Power consumption across the collection of devices is reduced. Additionally, power saving actions such as disabling Wi-Fi, GPS, or other I/O devices could be effected across the mobile devices of the different users when it is detected by one or more of those mobile devices that use of those these I/O devices are disadvantageous.

Figures 2, 3:
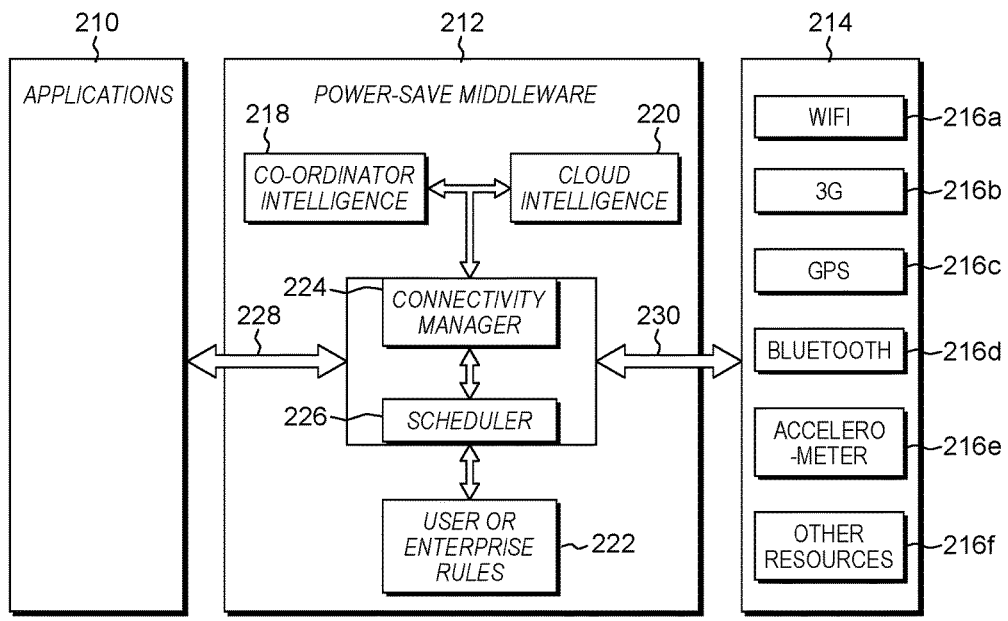
FIG. 2 depicts an example opportunistic coordination declarative interface (OCDI) middleware between application code of a mobile device and an operating system of the mobile device, in accordance with aspects described herein.
FIG. 3 depict an example context-based opportunistic rule look-up data structure maintained by a cloud-based rules engine, in accordance with aspects described herein.

Aspects described herein are provided in part through an interface (OCDI) that bridges mobile apps and the mobile operating systems that run those applications. FIG. 2 depicts an example OCDI middleware between application code of a mobile device and an operating system of the mobile device, in accordance with aspects described herein.

Applications 210 include program/application code for multiple applications that execute on the mobile device. Operating system 214 includes multiple APIs 216a-216f for retrieving data from various hardware features, including Wi-Fi, cellular (3G in this example), GPS, Bluetooth®, accelerometer, and any other resources utilizing I/O device data retrieval.

Disposed logically between the applications making the requests and the OS facilities for retrieving data from I/O devices, is OCDI power-saving middleware 212. The OCDI 212 provides an interface for receiving from applications and over communications channel 228 declarative language based data-retrieval requests for data from I/O devices of the mobile device, responding to those requests, and possibly performing other actions in response to those requests. When local hardware is called on to obtain data for responding to the request, the OCDI 212 may issue requests/commands over path 230 to the appropriate OS API (216a, 216b, . . . ) to retrieve data using the appropriate I/O device. When data is to be obtained from a remote device, such as another mobile device, OCDI can construct and initiate sending of the appropriate communication(s) to the another mobile device, for instance the OCDI thereof. The communications may be provided across any suitable communication link, such as a wireless network communication link or near-field communication link, as examples. The communication can request that the receiving mobile device leverage its local resources to obtain data for responding to the request. In some examples, the receiving mobile device need not necessarily initiate a separate query to one of its I/O devices, though this is a possibility. Instead, it may look in a buffer or other location that already stores data obtained from such an I/O device, for instance when current GPS data is maintained and periodically updated in a buffer.

In any event, when the OCDI obtains the appropriate data for responding to the requesting application, it responds to the request over channel 228 or another communication path to the application.

OCDI 212 may be implemented as program code that executes to perform functions. Such functions may be componentized as multiple different components. Coordinator intelligence 218 coordinates the usage of rules employed by the OCDI 212 in determining how to handle requests over channel 228. It can make determinations regarding the particular source to use to obtain the appropriate data for responding to a request (e.g. use accelerometer from device A, GPS from device B, etc.).

Cloud intelligence 220 represents the cloud-based rule engine resource that identifies and validates rules, and provides them to the local OCDI 212.

User/enterprise rules 222 represent hard-coded rules from the user or an enterprise such as the user's employer or company. In some examples, these provide tweaks and/or overrides to default actions dictated by the cloud-provided rules. As one example, in the case where the user has a vehicle that creates its own Wi-Fi network (e.g. CarNetwork) for passengers, the user may create a user rule that would override a cloud-provided rule indicating that the Wi-Fi adapter should be disabled when the user is traveling in the car (based on updating GPS location data, for instance). The user rule could specify that when the mobile device is connected to CarNetwork, the Wi-Fi adapter is to remain on even when the device is detected to be in motion.

Connectivity manager 224 and scheduler 226 provide and manage the connections to the I/O devices and schedule handling the requests/responses over paths 228 and 230. For instance, if one request indicates that a locating reading is needed and another request indicates that a motion reading is needed, the connectivity manager 224 and scheduler 226 will coordinate the multiple inquires to retrieve the data for responding, and the multiple responses back to the application(s) issuing the requests.

Cloud intelligence 220 facilitates the connection by OCDI to a cloud-facility that crowd-sources information to identify, define, create and/or update opportunistic coordination rules for the participating mobile devices. In the example of FIG. 1, the could-facility is represented by cloud server(s) 104 that provide the cloud-based rules engine. A mobile device, by way of the cloud intelligence 220 of the OCDI 212 for instance, fetches relevant rules from the cloud-based rules engine at runtime and based on the then-current mobile device operating context.

The mobile device context can refer to the context under which the device is currently being used. Context may be determined from one or more parameters under which the device is being used, examples of which include the time (clock time, day, week, month, year, time of year, etc.), location (physical, GPS location), location-type (home, work, etc.), connection status of the device (such as a current network connection to a trusted network, connections/presence of nearby devices), types of programs currently executing, or any other parameter describing a context under which the device is currently operating. Example environmental parameters include detected temperature, ambient light, sound, location, motion, proximity to other objects, devices, or users, detected nearby/network devices (based on network, near-field, Bluetooth®, or other connection, for instance), detected faces near the device, and so on. The parameters under which the device is being used can be determined using existing facilities of computing devices, for instance input from sensors and/or other I/O components of the mobile device. Microphones, proximity sensors, light sensors, accelerometers, GPS devices, network adapters, cameras, gyroscopes, are just some examples of I/O devices that can provide information for determining the current usage context of the mobile device. Other information, such as that provided by the operating system or otherwise, for instance current time/date, network connection information, presently running programs, or recently launched programs or procedures can also be used.

Crowd-sourced data may be used in the generation of rules by the cloud-based rules engine, referred to also as the Crowd Sourced Cloud (CSD). For instance, the CSD can parse online resources and/or mobile operating system guidelines to configure and initialize one or more rules. Additionally or alternatively, an initial corpus of rules/data may be initially loaded into the system as a starting point, which are statically configured, at least initially, and initialized.

These rules of the rule engine may be updated and/or new rules may be added based on learning from crowd-sourced collected data, including data reported back by devices about power consumption associated with different actions (such as querying a particular I/O device). By analyzing crowd-sourced data, various patterns may be discovered, which could lead to new rules being added to the CSD. Accordingly, a learning model is provided that mines data for rules and rule updates on-the-fly, and the rules provided by the cloud facility become more intelligent.

The CSD can maintain a context-based opportunistic rule look-up data structure, such as a table, and example of which is provided in FIG. 3. For simplicity, only three example mobile contexts are provided in table 300. Each such context has associated opportunistic coordination rules, which are provided to device(s) operating under the given context. In context 1 (302a), the user has only a smartwatch wearable mobile device. Associated rules 304a are the rules that will be provided to the user's mobile device—the smartwatch—and cached thereon locally. By way of example, "Rule 1" might specify that Wi-Fi scanning is to be disabled when the accelerometer of the smartwatch tracks that the user is engaged in a run for a duration of more than 3 minutes and/or for a distance of more than ¼ mile.

In context 2 (302b), which is an example context of intra-user opportunistic coordination, the user has both a smartwatch wearable mobile device and a mobile phone (smartphone) mobile device. Associated rules 304b are the rules that will be provided to the user's mobile devices—the smartwatch and the smartphone—and cached thereon locally. Alternatively, some rules may correspond only to a specific type(s) of mobile device (smartwatch), in which case the rule may not be delivered to other types of mobile devices. In some embodiments, rules that are delivered under one context are also delivered in a different context. For instance, the Rule 1 delivered in Context 1 may be equally applicable to each mobile device in context 2. In addition, and by way of example, "Rule 5" might specify that GPS data should be obtained according to the following order of priority: (i) the user's other device, if that is currently operating in navigation mode, otherwise (ii) the user's other device if that device's GPS device is currently enabled and if a GPS query by that device consumes less power than a GPS query using the local GPS hardware of the current device, otherwise (iii) the local GPS hardware of the current device.

In context 3 (302c), which is an example of inter-user opportunistic coordination, the first user has both a smartwatch wearable mobile device and a mobile phone (smartphone) mobile device, and a second, nearby user has a mobile phone (smartphone) mobile device. Under this context, associated rules 304c are provided to the devices of both users and cached thereon locally.

In some examples, the mobile device stores user/enterprise defined rules locally to an analogous opportunistic rule look-up data structure housed on the mobile device itself. The locally stored opportunistic rule look-up data structure may indicate rule(s) applicable to each of several contexts. In some examples, rules may be globally applicable, such as a rule that is to be active all of the time regardless the mobile device's usage context. In any case the local OCDI of a mobile device fetches the suitable opportunistic rules, for instance from the cloud-based rules engine and any local rules, based on the mobile device's context. In some examples, a change in context, such as discovery of a nearby additional mobile device, a user-activation of a previously disabled I/O device, launch of a navigation or other program that uses an I/O device, or change in location triggers a re-evaluation of the current context by the mobile device and a change to the applicable opportunistic coordination rules that OCDI should apply. Such rules may be saved in a local temporary space of OCDI or mobile device. In some examples, the local device caches rules applicable to several contexts. This is useful in situations where a mobile device tends to transition between a few primary contexts and/or when it can be predicted with reasonable confidence that the mobile device will transition into a given context. Thus, in some examples OCDI updates the rules in its local temporary space by querying the CSD again when a raised event indicates a change in mobile context.

At some point after context-applicable rules are cached on the mobile device, an app executing on the mobile device triggers a declarative language based data-retrieval request (Ex. "Get GPS data") directed to the mobile OS rather than, for instance, the OS GPS API(s) to fetch data. OCDI interfaces the data-retrieval request and parses it to determine initially what data is being requested by the app. OCDI then checks its locally-cached opportunistic rules and, based on the rules, decides the best method to obtain the requested data respond to the request. It then fetches, perhaps with the assistance of I/O device(s) of the mobile device or another mobile device, the data. In some examples, the OCDI communicates with the OCDI of another mobile device, perhaps via a cloud facility to which both mobile devices are connected, to obtain requested data from the another mobile device.

Following an above example, the OCDI of a smartphone may have a rule dictating that when the user's smartwatch is determined to have substantially the same location data as the smartphone (e.g. both are being carried/worn by the user or are in the same vehicle, as an example), then OCDI of the smartphone queries GPS data by querying the smartwatch to obtain the GPS data, rather than switching on the smartphone's GPS device, thereby saving power. In this case, when the OCDI of the smartphone receives a request from a local application to obtain the device's current location, the OCDI may reach out to the OCDI or OS of the smartwatch and receive current location data obtained from the GPS device of the smartwatch. The OCDI of the mobile device then responds to the request with the obtained GPS data.

Users are provided flexibility, manageability, and control to choose the levels of opportunistic coordination applied, for instance whether to switch on/off the provided opportunistic coordination services and/or individual rules. Users can also select between power sensitivity modes, enabling them to control the desired level of power savings depending on factors such as the criticality of the user's tasks. In a conservative mode, there is less focus on reduced power consumption and greater focus on the user experience (responsiveness, cost, etc.). In an aggressive mode, there is greater focus on (reducing) power consumption and less focus on other aspects such as response time.

By way of example, assume that the user is performing a relatively critical task like requesting a cab ride but the GPS I/O device of the user's smartphone is currently turned off In the conservative mode, whatever tasks the user performs (e.g. using the taxi app to send an immediate indication of current location) may be defined to be more important than querying another device to provide the GPS data, waiting for a response, then providing the response back to the taxi app. In this case, a rule dictating that GPS data is to be obtained from a nearby device because the GPS device of the user's smartphone is currently turned off may be overridden, in which opportunistic calling is not utilized in responding to the request. The request in this example may still be received by the OCDI, but the coordination intelligence (FIG. 2, #218) thereof may dictate that the local GPS device be used. The request may be passed through to the connectivity manager 224 and scheduled to perform immediately, or the request may be issued directly to the mobile OS via its standard API call for GPS data, as examples.

Using the example above but assuming the power sensitively mode is set to aggressive, for instance because battery life is below 5%, OCDI may be more likely to complete the task without turning on the smartphone GPS device, and instead obtain current location from another device.

Aspects described herein present approaches in which declarative language based data-retrieval queries are received from mobile apps and the requested data is output to the apps with minimal or optimized power consumption. This is facilitated through the discovery and application of run-time-specific opportunistic coordination rules that may be cached in the mobile device. The opportunistic coordination and collaboration is provided across different devices and users. It is based on device-contexts, in which intra-device, intra-user, and inter-user opportunistic coordination rules are retrieved from cloud-based server using crowd sourced information to develop context-specific rules to be applied across participating devices in order to fetch requested data and identify opportunities for power saving actions.

OCDI connects to the cloud-based rules engine from which opportunistic rules for the mobile device are fetched at runtime based on the mobile device context. In example embodiments to generate these rules at the crowd sourced cloud (CSD), the CSD parses online resources and/or operating system guidelines to statically configure and initialize rule(s). CSD can collect data through crowd-sourcing or otherwise. CSD can update the existing rules and add new rules based on machine learning from the crowd-sourced collected data. By analyzing crowd-sourced data, various patterns can be discovered that could identify new rules to provide on the CSD for deployment to mobile devices. The CSD can maintain a context-based opportunistic rule look-up table storing rules applicable to various contexts. OCDI on a mobile device can request CSD to provide the opportunistic rules specific to a context under which the mobile device operates. CSD can provide the rules to the mobile device for storage locally thereon.

The mobile device can detect when there is a relevant change in mobile device context. Based on this, OCDI of the mobile device can select other rule(s) that apply to the changed context, for instance by changing a set of rules the mobile device selects and evaluates to determine how to respond to requests from apps. In some examples, the update to the mobile device context is a triggering event that triggers the OCDI to reach out to the CDS for rule(s) applicable to the changed context. The mobile device receives from CSD the rules applicable to the changed context and updates its local temp space with these rules.

Apps running on a mobile device can trigger declarative language based data-retrieval requests, rather than, for instance, issuing direct calls to the OS APIs to fetch data. The OCDI receives a declarative language based data-retrieval request and parses it to figure out what data is being requested by the app. OCDI then checks its locally cached opportunistic rule(s) and, based on evaluating one or more of those rule(s), for instance the one or more ones specifically applicable to the particular request being made, determines the best approach to fetch the requested data and initiates that fetch. Under one example, the OCDI of the user's smartphone may have a rule applicable when the user's smartwatch and smartphone have substantially the same location data, in which the OCDI of user's smartphone will directly use GPS data from the smartwatch by querying the smartwatch, rather than switching on the smartphone's own GPS, thereby saving power of the smartphone.

The following present some features and characteristics of approaches described herein:

Declarative language based data retrieval through OCDI, as compared to calling the OS APIs directly;

OCDI connects to a cloud facility where various opportunistic coordination rules applicable under various mobile contexts, mobile device types, etc. are learned/updated and pushed to the OCDI of participating mobile devices based on the usage contexts of those mobile devices;

Mobile devices can expose their hardware/sensor capabilities as micro-services that get published and subscribed-to based on opportunistic coordination rules learned and pushed from the cloud facility to which the OCDI instances of various mobile devices connect. Over time, there may be new resources, I/O channels, etc. that come into existence. The opportunistic coordination can be structured as a set of micro-services where administrators or other uses can add new micro-services for new I/O channels and their associated rules. The micro-services can be part of the cloud facility and rules added, updated, and developed to leverage those. Thus, the micro-services can be server-side offerings that are based on some underlying device-specific APIs that become available. A new declarative API can then be added to the client mobile device and supported by OCDI for calls to use the service. Thus, the OCDI framework bridging the user apps to the OS facilities applies the right opportunistic coordination rules in publishing and subscribing to various micro-services for better power efficiency.

Aspects described herein provide a programming interface (OCDI) that bridges mobile apps and OS facilities to obtain I/O data. The OCDI accepts input of a declarative language based data-retrieval query from a mobile app, and outputs the requested data to the app with minimal/optimal power consumption. This is facilitated through the discovery and application of run-time opportunistic coordination rules to coordinate power saving actions within the mobile device and across devices, based on the mobile device contexts under which the mobile devices used in requesting the I/O data. Such rules may be retrieved from a crowd-sourced server based on an identification of mobile device context. These and other aspects provide advancements over other approaches by at least: providing declarative language based programming interface support for I/O data retrieval requests; learning and generating opportunistic coordination rules in a crowd-sourced cloud environment through cognitive analysis that is updated over time based on the data-collection and user context preferences; and applying, by OCDI at runtime, the suitable opportunistic rule(s) fetched from the crowd-sourced cloud facility based on mobile context, in order to determine the best intra-device or inter-device data retrieval method.

Figure 4A:
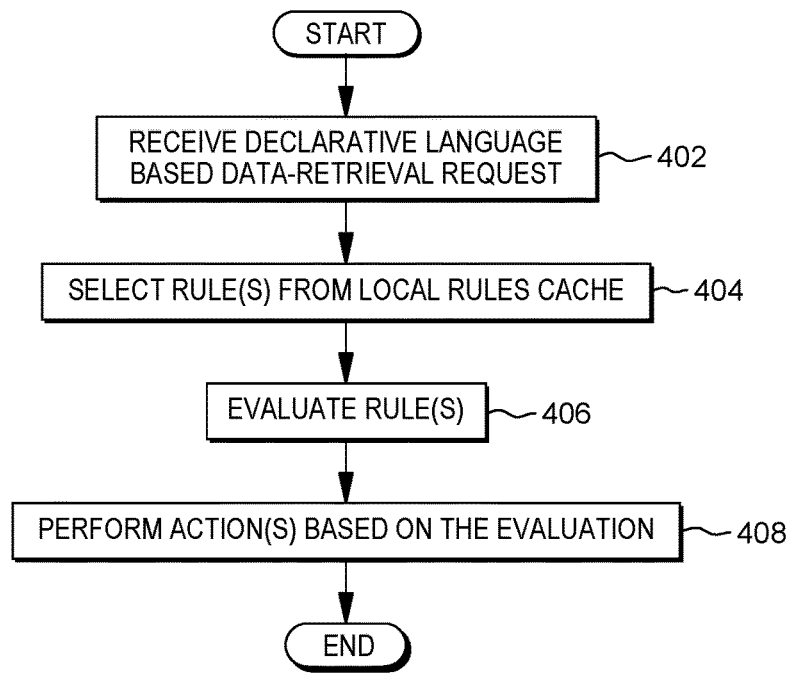
FIG. 4A depicts an example process for handling a data-retrieval request to retrieve data from an I/O device of a mobile device, in accordance with aspects described herein.

Accordingly, FIG. 4A depicts an example process for handling a data-retrieval request to retrieve data from an I/O device of a mobile device, in accordance with aspects described herein. In some examples, the process of FIG. 4A is performed by a computer system, such as the mobile device itself. The process of FIG. 4A begins with an interface (e.g. OCDI) between application code of a mobile device and an operating system of the mobile device receiving a declarative language based data-retrieval request made by the application code for data from an input-output (I/O) device of the mobile device (402). In some examples, the I/O device includes or is a sensor of the mobile device, and/or a communications adapter of the mobile device. Example communications adapters include Bluetooth® adapters and network adapters, such as a Wi-Fi network adapter.

The process continues by selecting, based on operating context of the mobile device, one or more opportunistic coordination rules from a local rules cache (404). The one or more opportunistic coordination rules may be representative of at least one power-saving option for retrieving data for responding to the request for data from the I/O device. The operating context may be detected prior to the selecting and based on various events, such as events triggered or recognized based on environmental data, indications of nearby devices, and/or running processes, as examples.

The process continues by evaluating the selected one or more opportunistic coordination rules (406), for instance to determine how to retrieve data for responding to the request. The selection and/or evaluation of the rule(s) can be based at least in part on parameters of the data-retrieval request. For example, a specific rule may be applicable to GPS data requests but not network connection requests.

Next, the process performs one or more actions based on the evaluating (408). Various actions are possible. In some examples, the one or more actions include responding to the request, for instance with the data requested by the request. The response may be provided to the application code that initiated the request to the interface.

In examples where the I/O device is in a dormant state and the operating context indicates proximity to another mobile device, the one or more opportunistic coordination rules selected and evaluated indicate that the data for responding to the request is to be obtained from the another mobile device. In this situation, the one or more actions can include retrieving from the another mobile device the data for responding to the request, and providing the data in responding to the request.

Additionally or alternatively, the one or more actions may include initiating power-saving action(s) to adjust a state of another I/O device, i.e. other than the I/O device which was to supply the requested data.

The another I/O device may be another (i.e. different) I/O device of the mobile device itself. The power saving action may include adjusting the state (disabled, off, sleep, on, standby, etc.) of the another I/O device. The adjusting may adjust to a state of decreased power consumption of the another I/O device and/or may avoid additional power consumption, for example by blocking/disabling one or more future requests of the another I/O device which would consume power if allowed to complete.

Additionally or alternatively, the mobile device may be a first mobile device, and the another I/O device may be of a second mobile device that is different than the first mobile device. The initiating the power-saving action(s) may include providing a communication to the second mobile device indicating that the state of the another I/O device can be adjusted to facilitate a decrease in power consumption or avoid additional power consumption. In this manner, the power-saving action to adjust the state of the another I/O device may be performed by the second mobile device based on the first mobile device initiating that power-saving action by sending the communication to the second mobile device.

In some examples, the evaluating of the rule(s) selects, based on requests made to one or more other I/O devices, an I/O device to be used to obtain the data for responding to the request, and the one or more actions include using the selected I/O device to obtain the data for responding, and providing the data in responding to the request. As an example, data from one sensor obtained based on requests made to that sensor provides information based on which OCDI determines which device to use to obtain data of the subject request being handled. For instance, the request may be to establish a network connection to a particular destination and retrieve data therefrom. Data from an accelerometer and/or GPS device may indicate that the mobile device is in relatively fast motion across a relatively long distance. OCDI might use that information to determine that enabling the Wi-Fi adapter and connecting to a Wi-Fi network to complete the request may result in a more significant power consumption and unreliable connection. Consequently, OCDI might determine to use the cellular connection to complete the request and respond with requested data.

A collection of multiple mobile devices may participate in the opportunistic coordination described herein. At least one of the one or more opportunistic coordination rules selected from the local rules cache may be initially retrieved from a remote facility, such as a cloud-based rules engine that hosts a plurality of opportunistic coordination rules for the multiple mobile devices. The multiple mobile devices may retrieve sets of rule(s) selected from the plurality of rules on the remote facility, the set for each mobile device being based on the mobile device's respective operating context(s). Some rules may be included in more than one such set, e.g. the same rule may appear in rule sets for different contexts or different devices. The plurality of rules available from the cloud-based facility can dictate coordination among the collection of mobile device I/O devices, the mobile device I/O devices being (i) components of the mobile device, (ii) components of multiple mobile devices of a common user, or (iii) components of multiple mobile devices of several different users.

In some examples, the evaluating the rule(s) includes recognizing that a power sensitivity mode under which the mobile device is currently operating indicates that a power-saving option (e.g. retrieving data from a source other than the I/O device) for retrieving data for responding to the request is to be overridden and instead (of engaging in the power-saving option), the I/O device of the mobile device is to be used to obtain the data for responding to the request. In this scenario, the one or more actions include using the I/O device to obtain the data for responding, and providing the data in responding to the request.

Figure 4B:
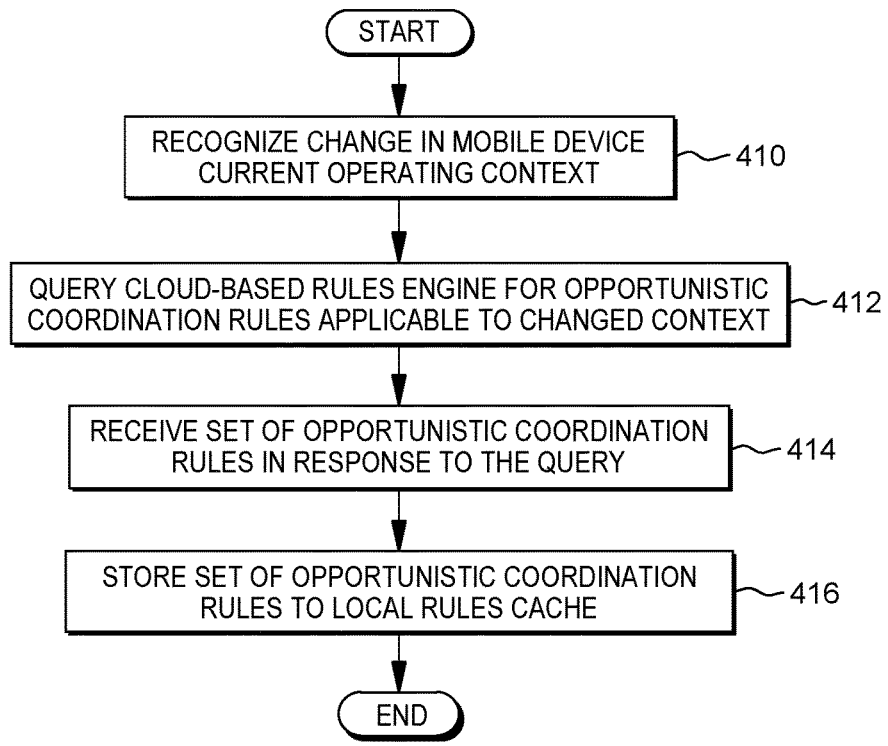
FIG. 4B depicts an example process of updating a local rules cache based on a change in context under which a mobile device currently operates, in accordance with aspects described herein.

As noted, the one or more opportunistic coordination rules are selected from a local rules cache. The rules in this cache may be updated based on a change in the operating context of the mobile device. Changes in operating context may be significant because they might add, remove, or modify options for retrieving requested data and options for power-saving options. FIG. 4B depicts an example process of updating the local rules cache based on a change in context under which the mobile device currently operates, in accordance with aspects described herein. In some examples, the process is performed by the mobile device, for instance the OCDI or a routine called by OCDI. The process begins with recognizing the change in context under which the mobile device currently operates (410). This may be based on any of various events, such as events indicating a change in location, change in connection status with nearby devices, launch of a program, or detection of new sensor data, as examples. Next, the process queries a cloud-based rules engine for opportunistic coordination rules applicable to the changed context (412). The cloud-based rules engine may store a plurality of opportunistic coordination rules that are representative of power-saving options for retrieving data for responding to requests for data from I/O devices under different operating contexts, including the changed current operating context of the mobile device.

The process receives, at runtime and with the mobile device operating under the changed context, a set of opportunistic coordination rules in response to the querying (414) and stores the set of opportunistic coordination rules to the local rules cache (416). The stored set of opportunistic coordination rules can be some of the rules in the local rules cache. Other rule(s) in the cache may be user-defined or enterprise-defined rules that are created, maintained, and/or retrieved separate from those available from the cloud-based rules engine.

Accordingly, at least one opportunistic coordination rule of the selected one or more opportunistic coordination rules is obtained from a plurality of opportunistic coordination rules available from the cloud-based rules engine. The at least one rule may be identified and validated based on crowd-sourced data, as described below. Additionally, the local rules cache can include at least one user-defined opportunistic coordination rule as well as the at least one cloud-based rules engine-obtained opportunistic coordination rule. In some embodiments, the selecting gives priority to the at least one user-defined opportunistic coordination rule over the at least one cloud-based rules engine-obtained opportunistic coordination rule, meaning that even if a cloud-sourced rule is applicable to achieve power savings, the user-defined rule may take priority. In some examples, the user-defined rule dictates an action that demands more power than the action specified in the cloud-sourced rule.

The cloud-based rule engine can be loaded initially with a corpus of rules/data as a starting point. These rules can be statically configured and initialized for use. The engine can periodically or aperiodically retrieve crowd-sourced data such as information from online resources and operating system/device specific guidelines. The engine can analyze the crowd-sourced data, for example mine for patterns and perform other forms of machine learning. The analysis can be used to update the initial rules and/or identify and validate new rules. One or more of the rules retrieved by a mobile device can be configured and initialized based on the crowd-sourced data, such as the information from the online resources and/or operating system guidelines. Thus, the plurality of rules available from the cloud facility can include those rules added based on the analysis of the crowd-sourced data for patterns and automatically learning from the crowd-sourced data. In addition, a collection of initial opportunistic coordination rules may be statically loaded into the cloud-based rules engine and are updated based on the crowd-sourced data to produce at least some of the plurality of opportunistic coordination rules available from the engine.

Processes described herein may be performed singly or collectively by one or more computer systems, such as computer system(s) described below with reference to FIG. 5. In some embodiments, such a computer system may be or include a remote cloud server or a mobile device.

Figure 5:
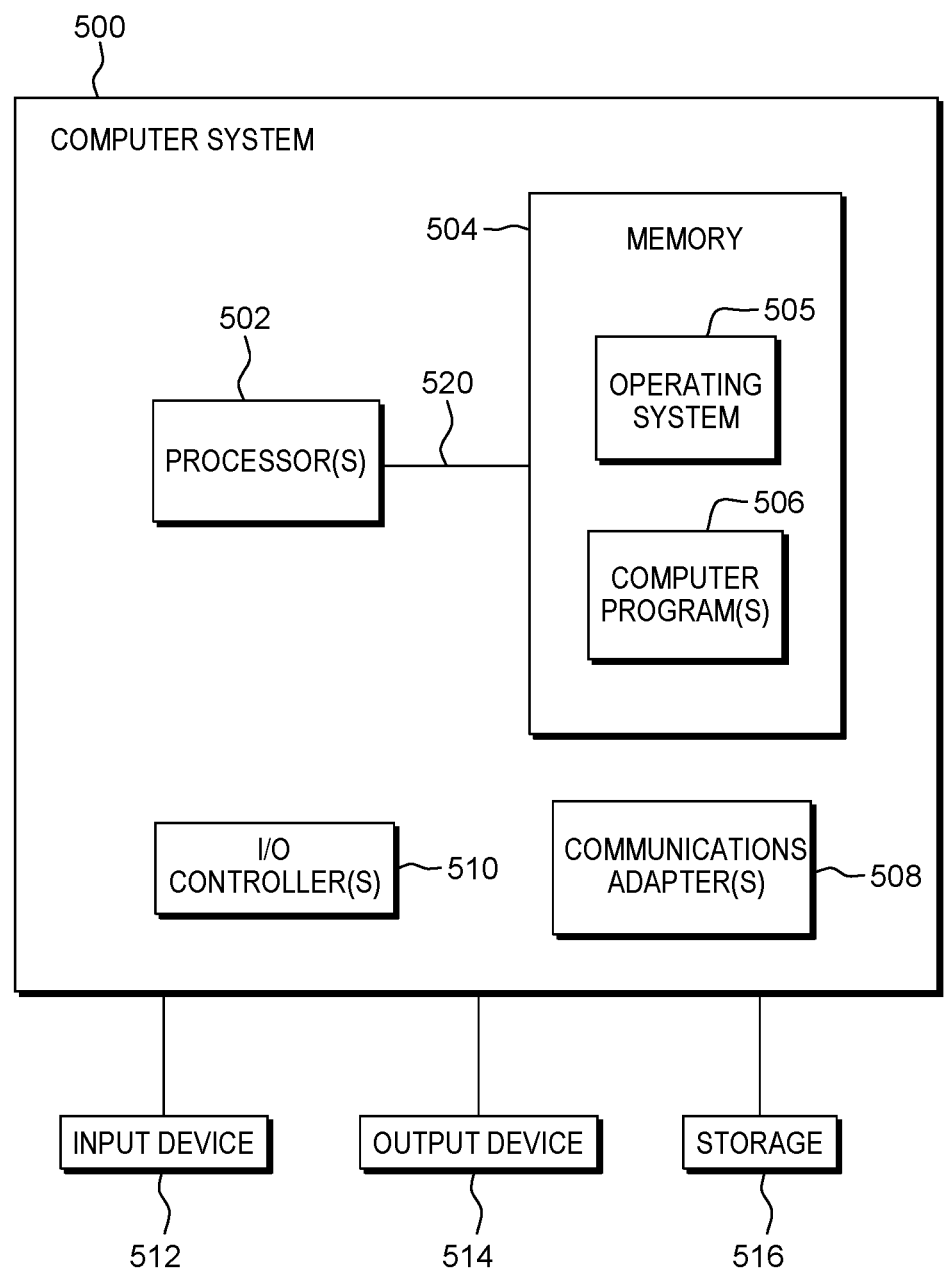
FIG. 5 depicts an example computer system to incorporate and use aspects described herein.

FIG. 5 depicts one example of a computer system to incorporate or use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Computer system can incorporate Input/Output (I/O) devices 512, 514 (including but not limited to displays, microphones, speakers, accelerometers, gyroscopes, magnetometers, GPS devices, cameras, and sensors such as light sensors, proximity sensors, temperature sensors, etc.). Some I/O devices perform data input and data output. In some examples, the I/O devices are coupled to the system either directly or through I/O controllers 510.

Communications adapter(s) 508 may also be incorporated into and/or coupled to the system to enable the computer system to become coupled to other computer systems, storage devices, or the like through intervening private or public networks. Example communications adapters are cellular network adapters, Ethernet-based (such as Wi-Fi) interfaces, and Bluetooth® adapters.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
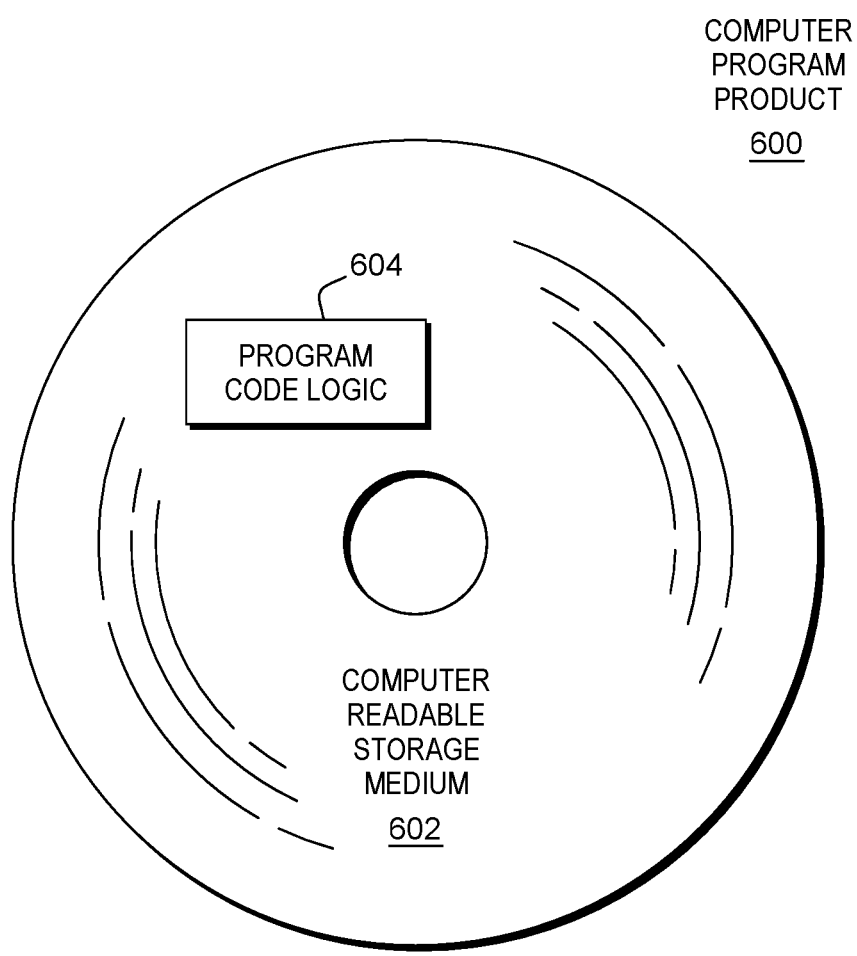
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, by an interface between application code of a mobile device and an operating system of the mobile device, a declarative language based data-retrieval request made by the application code for data from an input-output (I/O) device of the mobile device;
based on operating context of the mobile device, selecting one or more opportunistic coordination rules from a local rules cache, the one or more opportunistic coordination rules representative of at least one power-saving option for retrieving data for responding to the request for data from the I/O device;
evaluating the one or more opportunistic coordination rules to determine how to retrieve data for responding to the request; and
performing one or more actions based on the evaluating, the one or more actions comprising responding to the request.

2. The method of claim 1, wherein the I/O device is in a dormant state and the operating context indicates proximity to another mobile device, wherein the one or more opportunistic coordination rules indicate that the data for responding to the request is to be obtained from the another mobile device, and wherein the one or more actions comprise retrieving from the another mobile device the data for responding to the request and providing the data in responding to the request.

3. The method of claim 1, wherein the one or more actions further comprise initiating a power-saving action to adjust a state of another I/O device other than the I/O device of the mobile device.

4. The method of claim 3, wherein the another I/O device is another I/O device of the mobile device, and wherein the power saving action comprises adjusting the state of the another I/O device to decrease its power consumption or avoid additional power consumption.

5. The method of claim 3, wherein the mobile device is a first mobile device, wherein the another I/O device is of a second mobile device different than the first mobile device, and wherein the initiating comprises providing a communication to the second mobile device indicating that the state of the another I/O device can be adjusted to facilitate a decrease in power consumption or avoid additional power consumption.

6. The method of claim 1, wherein the evaluating selects, based on requests made to one or more other I/O devices, an I/O device to be used to obtain the data for responding to the request, and the one or more actions comprise using the selected I/O device to obtain the data for responding and providing the data in responding to the request.

7. The method of claim 1, wherein the I/O device comprises a sensor of the mobile device or a communications adapter of the mobile device.

8. The method of claim 1, wherein at least one opportunistic coordination rule of the one or more opportunistic coordination rules is obtained from a plurality of opportunistic coordination rules available from a cloud-based rules engine and is identified and validated based on crowd-sourced data.

9. The method of claim 8, wherein a collection of initial opportunistic coordination rules is statically loaded into the cloud-based rules engine and is dynamically updated based on the crowd-sourced data to produce at least some of the plurality of opportunistic coordination rules available from the cloud-based rules engine.

10. The method of claim 8, wherein the crowd-sourced data comprises online resources and operating system guidelines, and wherein the at least one opportunistic coordination rule of the one or more opportunistic coordination rules is configured and initialized based on the online resources and operating system guidelines.

11. The method of claim 8, wherein the at least one opportunistic coordination rule of the one or more opportunistic coordination rules is added to the plurality of opportunistic coordination rules available from the cloud-based rules engine based on analyzing the crowd-sourced data for one or more patterns and automatically learning from the crowd-sourced data.

12. The method of claim 8, wherein the local rules cache comprises at least one user-defined opportunistic coordination rule and the at least one cloud-based rules engine-obtained opportunistic coordination rule, wherein the selecting gives priority to the at least one user-defined opportunistic coordination rule over the at least one cloud-based rules engine-obtained opportunistic coordination rule.

13. The method of claim 8, wherein the plurality of opportunistic coordination rules dictate coordination among a collection of mobile device I/O devices, the mobile device I/O devices being (i) components of the mobile device, (ii) components of multiple mobile devices of a common user, or (iii) components of multiple mobile devices of multiple different users.

14. The method of claim 1, further comprising updating the local rules cache based on a change in context under which the mobile device currently operates, the updating comprising:
recognizing the change in context under which the mobile device currently operates;
querying a cloud-based rules engine for opportunistic coordination rules applicable to the changed context, the cloud-based rules engine having a plurality of opportunistic coordination rules representative of power-saving options for retrieving data for responding to requests for data from I/O devices under different operating contexts;
receiving, at runtime and with the mobile device operating under the changed context, a set of opportunistic coordination rules in response to the querying; and
storing the set of opportunistic coordination rules to the local rules cache, the set of opportunistic coordination rules being at least one opportunistic coordination rule of the one or more opportunistic coordination rules.

15. The method of claim 1, wherein the evaluating comprises recognizing that a power sensitivity mode under which the mobile device is currently operating indicates that a power-saving option for retrieving data for responding to the request is to be overridden and instead the I/O device of the mobile device is to be used to obtain the data for responding to the request, wherein the one or more actions comprise using the I/O device to obtain the data for responding and providing the data in responding to the request.

16. A computer program product comprising:
a non-transitory computer readable storage medium readable by a processor and storing instructions for execution by the processor for performing a method comprising:
receiving, by an interface between application code of a mobile device and an operating system of the mobile device, a declarative language based data-retrieval request made by the application code for data from an input-output (I/O) device of the mobile device;

based on operating context of the mobile device, selecting one or more opportunistic coordination rules from a local rules cache, the one or more opportunistic coordination rules representative of at least one power-saving option for retrieving data for responding to the request for data from the I/O device;

evaluating the one or more opportunistic coordination rules to determine how to retrieve data for responding to the request; and performing one or more actions based on the evaluating, the one or more actions comprising responding to the request.

17. The computer program product of claim 16, wherein the one or more actions further comprise initiating a power-saving action to adjust a state of another I/O device other than the I/O device of the mobile device.

18. The computer program product of claim 16, wherein at least one opportunistic coordination rule of the one or more opportunistic coordination rules is obtained from a plurality of opportunistic coordination rules available from a cloud-based rules engine and is identified and validated based on crowd-sourced data, and wherein the at least one opportunistic coordination rule of the one or more opportunistic coordination rules is added to the plurality of opportunistic coordination rules available from the cloud-based rules engine based on analyzing the crowd-sourced data for one or more patterns and automatically learning from the crowd-sourced data.

19. The computer program product of claim 16, wherein the method further comprises updating the local rules cache based on a change in context under which the mobile device currently operates, the updating comprising:

recognizing the change in context under which the mobile device currently operates;

querying a cloud-based rules engine for opportunistic coordination rules applicable to the changed context, the cloud-based rules engine having a plurality of opportunistic coordination rules representative of power-saving options for retrieving data for responding to requests for data from I/O devices under different operating contexts;

receiving, at runtime and with the mobile device operating under the changed context, a set of opportunistic coordination rules in response to the querying; and storing the set of opportunistic coordination rules to the local rules cache, the set of opportunistic coordination rules being at least one opportunistic coordination rule of the one or more opportunistic coordination rules.

20. The computer program product of claim 16, wherein at least one opportunistic coordination rule of the one or more opportunistic coordination rules is obtained from a plurality of opportunistic coordination rules available from a cloud-based rules engine, and wherein the plurality of opportunistic coordination rules dictate coordination among a collection of mobile device I/O devices, the mobile device I/O devices being (i) components of the mobile device, (ii) components of multiple mobile devices of a common user, or (iii) components of multiple mobile devices of several different users.

21. A computer system comprising:

a memory; and a processor in communications with the memory, wherein the computer system is configured to perform a method, the method comprising:

receiving, by an interface between application code of a mobile device and an operating system of the mobile device, a declarative language based data-retrieval request made by the application code for data from an input-output (I/O) device of the mobile device;

based on operating context of the mobile device, selecting one or more opportunistic coordination rules from a local rules cache, the one or more opportunistic coordination rules representative of at least one power-saving option for retrieving data for responding to the request for data from the I/O device;

evaluating the one or more opportunistic coordination rules to determine how to retrieve data for responding to the request; and performing one or more actions based on the evaluating, the one or more actions comprising responding to the request.

22. The computer system of claim 21, wherein the one or more actions further comprise initiating a power-saving action to adjust a state of another I/O device other than the I/O device of the mobile device.

23. The computer system of claim 21, wherein at least one opportunistic coordination rule of the one or more opportunistic coordination rules is obtained from a plurality of opportunistic coordination rules available from a cloud-based rules engine and is identified and validated based on crowd-sourced data, and wherein the at least one opportunistic coordination rule of the one or more opportunistic coordination rules is added to the plurality of opportunistic coordination rules available from the cloud-based rules engine based on analyzing the crowd-sourced data for one or more patterns and automatically learning from the crowd-sourced data.

24. The computer system of claim 21, wherein the method further comprises updating the local rules cache based on a change in context under which the mobile device currently operates, the updating comprising:

recognizing the change in context under which the mobile device currently operates;

querying a cloud-based rules engine for opportunistic coordination rules applicable to the changed context, the cloud-based rules engine having a plurality of opportunistic coordination rules representative of power-saving options for retrieving data for responding to requests for data from I/O devices under different operating contexts;

receiving, at runtime and with the mobile device operating under the changed context, a set of opportunistic coordination rules in response to the querying; and storing the set of opportunistic coordination rules to the local rules cache, the set of opportunistic coordination rules being at least one opportunistic coordination rule of the one or more opportunistic coordination rules.

25. The computer system of claim 21, wherein at least one opportunistic coordination rule of the one or more opportunistic coordination rules is obtained from a plurality of opportunistic coordination rules available from a cloud-based rules engine, wherein the plurality of opportunistic coordination rules dictate coordination among a collection of mobile device I/O devices, the mobile device I/O devices being (i) components of the mobile device, (ii) components of multiple mobile devices of a common user, or (iii) components of multiple mobile devices of several different users.

* * * * *